United States Patent
Gu et al.

(10) Patent No.: US 12,233,462 B2
(45) Date of Patent: Feb. 25, 2025

(54) SOLUTION PROCESSED METALLIC NANO-GLASS FILMS

(71) Applicant: The Board of Trustees of the Leland Stanford Junior University, Stanford, CA (US)

(72) Inventors: Xun Gu, Palo Alto, CA (US); Mehrdad T Kiani, Redwood City, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 416 days.

(21) Appl. No.: 17/764,785

(22) PCT Filed: Oct. 10, 2020

(86) PCT No.: PCT/US2020/055171
§ 371 (c)(1),
(2) Date: Mar. 29, 2022

(87) PCT Pub. No.: WO2021/072341
PCT Pub. Date: Apr. 15, 2021

(65) Prior Publication Data
US 2022/0355378 A1  Nov. 10, 2022

Related U.S. Application Data

(60) Provisional application No. 62/914,089, filed on Oct. 11, 2019.

(51) Int. Cl.
| | |
|---|---|
| B22F 7/04 | (2006.01) |
| C22C 45/00 | (2023.01) |
| C22C 45/02 | (2006.01) |
| C22C 45/04 | (2006.01) |

(52) U.S. Cl.
CPC .............. *B22F 7/04* (2013.01); *C22C 45/008* (2013.01); *C22C 45/02* (2013.01); *C22C 45/04* (2013.01); *C22C 2200/02* (2013.01)

(58) Field of Classification Search
None
See application file for complete search history.

(56) References Cited

U.S. PATENT DOCUMENTS 8,932,514 B1 * 1/2015 Yin .......................... B32B 5/30
264/603

OTHER PUBLICATIONS

Mehrdad T. Kiani, et al., Ductile Metallic Glass Nanoparticles via Colloidal Synthesis, Nano Lett. Aug. 10, 2020. vol. 20, No. 9, p. 6481-6487.

D.Z. Chen, X.W. Gu, Q. An, W.A. Goddard, J.R. Greer, "Ductility and work hardening in nano-sized metallic glasses," Applied Physics Letters, 106, 061903 (2015).

* cited by examiner

*Primary Examiner* — Anthony M Liang
(74) *Attorney, Agent, or Firm* — LUMEN PATENT FIRM

(57) ABSTRACT

A consolidated metallic glass structure is formed by fabricating [200] metallic glass nanoparticles with a solution-phase synthesis that provides coated metallic glass nanoparticles with a polymer ligand layer; stripping [202] the polymer ligand layer from the coated metallic glass nanoparticles to provide bare metallic glass nanoparticles; depositing [204] the bare metallic glass nanoparticles on a substrate to provide a deposited structure; and sintering [206] the deposited structure with heat and/or pressure to provide the consolidated metallic glass structure. The metallic glass nanoparticles are preferably composed substantially of nickel and boron, iron and boron, or cobalt and boron.

4 Claims, 5 Drawing Sheets

200
fabricating metallic glass nanoparticles with a solution-phase synthesis that provides coated metallic glass nanoparticles wrapped in a polymer ligand layer

202
stripping the polymer ligand layer from the coated metallic glass nanoparticles with a solvent to provide bare metallic glass nanoparticles

204
depositing the bare metallic glass nanoparticles on a substrate to provide a deposited structure

206
sintering the deposited structure with heat and/or pressure to provide the consolidated metallic glass structure

*Fig. 2*

SOLUTION PROCESSED METALLIC NANO-GLASS FILMS

FIELD OF THE INVENTION

The present invention relates generally to metallic glasses. More specifically, it relates to methods for fabricating metallic glasses.

BACKGROUND OF THE INVENTION

Metallic glasses are metals that lack crystallinity and long range atomic order. Compared to crystalline metals, metallic glasses are amorphous and have high strength, elastic limit (elongation before permanent deformation occurs), and corrosion resistance. Metallic glass films are of interest as coatings for biomedical implants, wear-resistant industrial tools, naval parts, and microelectronics.

The major impediment to the widespread use of MGs is their limited ductility. Unlike crystalline metals in which plastic deformation occurs through the motion of dislocations, the room temperature deformation of MGs typically occurs through the cooperative shearing of clusters of atoms called shear transformation zones (STZs). The passage of successive STZs in a MG leads to the formation of shear bands. This can cause sudden, catastrophic failure in tension and intermittent flow in compression and bending.

Metallic glass film coatings are currently made using sputtering or electrodeposition. Sputtering requires bulky and expensive vacuum chambers and high-energy power sources, and cannot be used to deposit films on delicate substrates. In addition, sputtered films have limited compositions and microscale atomic arrangements (microstructures). This means that the films have limited toughness, and are prone to sudden failure under mechanical or thermal stress.

SUMMARY OF THE INVENTION

This work provides a method for forming strong and tough metallic glass thin films using solution-processing techniques, with unique microstructures (microscale atomic arrangements). Compared to sputtering, this method does not need complex equipment, and results in metallic glass films, which have improved toughness compared to conventional films.

Metallic glass nanoparticles according to embodiments of the invention are formed through solution-phase synthesis techniques. A colloidal synthesis is used to achieve favorable atomic bonding within a nanoscale metallic glass to achieve high ductility films. The resulting metallic glass nanoparticles exhibit homogeneous deformation at room temperature and moderate strain rates ($0.001$-$0.01$ $s^{-1}$). The nano-glass microstructure is characterized by regions of high density and low density. The spacing of these regions is the same as the size of the nanoparticles. This microstructure imparts high toughness to the films.

In one aspect, the invention provides a method of making a consolidated metallic glass structure, the method comprising: fabricating metallic glass nanoparticles with a solution-phase synthesis that provides coated metallic glass nanoparticles with a polymer ligand layer; stripping the polymer ligand layer from the coated metallic glass nanoparticles to provide bare metallic glass nanoparticles; depositing the bare metallic glass nanoparticles on a substrate to provide a deposited structure; and sintering the deposited structure with heat and/or pressure to provide the consolidated metallic glass structure. Fabricating the metallic glass nanoparticles may comprise combining a metallic salt with a reducing agent in the presence of a polymer ligand. The metallic glass nanoparticles are preferably composed substantially of nickel and boron, iron and boron, or cobalt and boron. Stripping the polymer ligand layer from the coated metallic glass nanoparticles may comprise removing substantially all of the ligand layer from the coated metallic glass nanoparticles using a solvent and/or heat. Sintering the deposited structure may comprise using a hot press, heated pellet press, or spark plasma sintering. Applications of the resulting materials include but are not limited to strong and hard thin film coatings for biomedical implants and micro-electronics. These coatings can add corrosion and wear resistance, and protect the substrate from impacts and scratches.

BRIEF DESCRIPTION OF THE DRAWINGS

FIG. 2 is a flow chart providing an outline of a method of fabricating metallic glass nanoparticle structure, according to an embodiment of the invention.

DETAILED DESCRIPTION

Figures 1A, 1B:
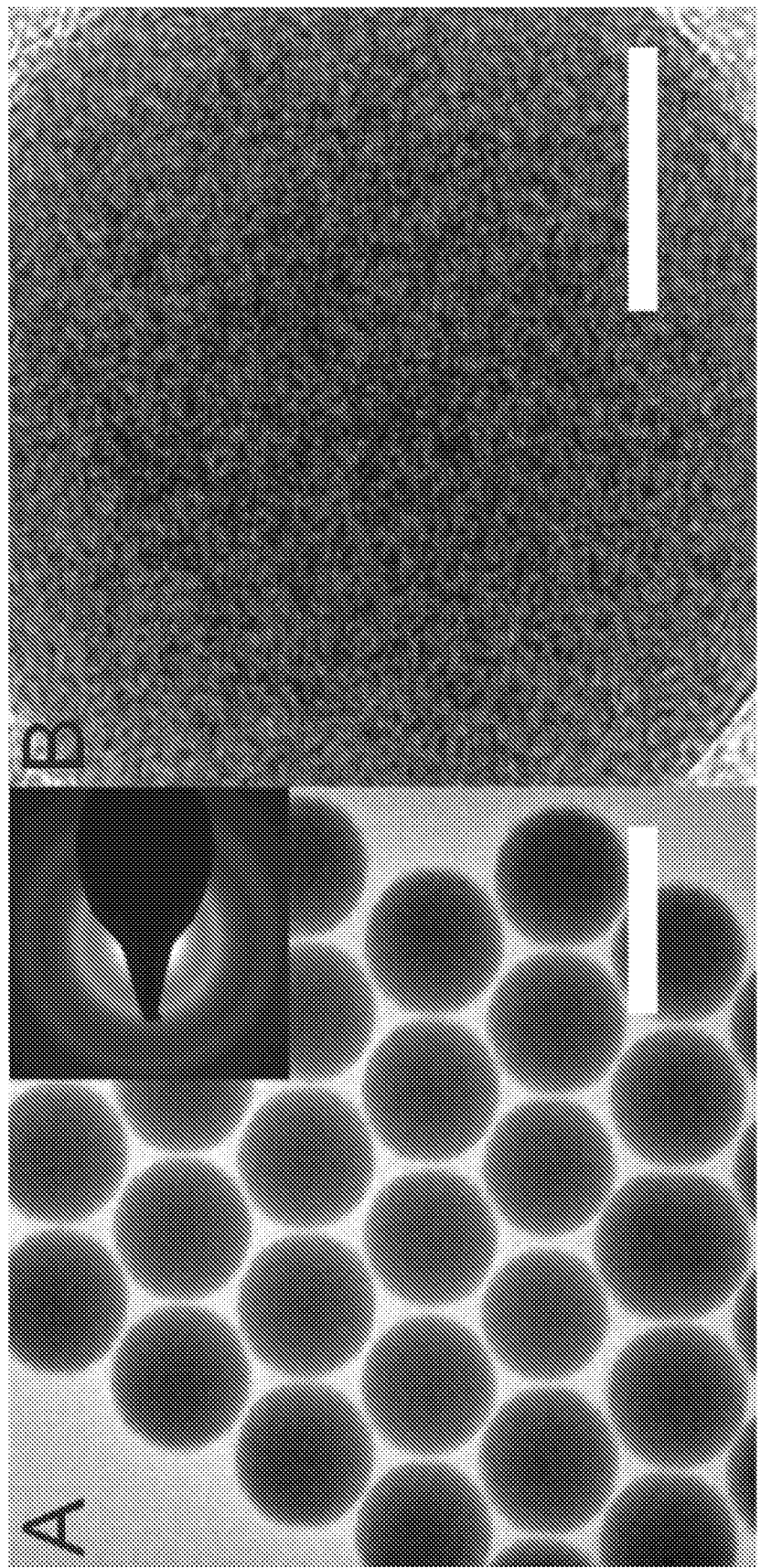
FIG. 1A is a bright field TEM image of 74 nm nanoparticles, according to an embodiment of the invention.
FIG. 1B shows an HRTEM image of a 30 nm nanoparticle, according to an embodiment of the invention.

Embodiments of the invention provide methods to fabricate and compress MG nanoparticles with large free volume that do not exhibit this ductile-to-brittle transition. In one embodiment of the invention, outlined in FIG. 2, metallic glass nanoparticles are fabricated in step 200 with a solution-phase synthesis that provides coated metallic glass nanoparticles wrapped in a polymer ligand layer. In one implementation, a metallic salt is combined with a strong reducing agent in the presence of a polymer ligand, which results in metallic glass nanoparticles. For example, these may be nickel, iron and/or cobalt-based metallic glass nanoparticles. These nanoparticles, due to the solution-phase synthesis, are significantly more ductile (greater elongation before failure) than metallic glasses fabricated via other means. Following synthesis, in step 202, the polymer ligand layer is stripped from the coated metallic glass nanoparticles with a solvent to provide bare metallic glass nanoparticles. For example, the particles may be stripped of the protective ligand layer using solvents such as acetone and isopropanol. Stripping the protective ligand layer is defined herein to mean removing substantially all of the ligand layer. It is desired to remove as much of the ligand as possible since it prevents effective consolidation and becomes more of a composite metallic glass-polymer structure. Nonetheless, some small residue may remain on the bare nanoparticles without substantially affecting the end product. In step 204, the bare metallic glass nanoparticles are deposited from solution on a substrate to provide a deposited structure. In one implementation, for example, a solid film of ~200 nm to 10 micron thickness is formed by using pressure and/or heat to sinter the particles, such as using a hot press.

Ligands used in the process above may include various appropriate ligands including oleic acid, citric acid, and/or trisodium citrate. Reducing agents may include various other compounds such as $NaBH_4$. Metallic salts may include various compounds such as Nickel nitrate, Cobalt Nitrate, and/or Iron Sulfate. The stripping may be done using a solvent, heat, and/or chemical process.

A film composed of the nanoparticles is formed by depositing collected particles onto a surface or into a die. The die is then heated while pressure is applied to the die. Increasing both pressure applied and temperature reduces porosity and leads to sintering. The temperature of this step should be carefully controlled to remain below the crystallization temperature of MG, which is around 300 C for Ni and 400 C for Fe, for example. Increasing the time heated/pressed reduces porosity and promotes sintering.

In an illustrative example, Ni-based MG nanoparticles are fabricated. Force-displacement curves show two linear regimes with a transition between the regimes identified by a single slowly propagating slip event (5-10 nm/s) for 90-270 nm particles. The bonding characteristics, specifically the interplay of metallic and metal-metalloid bonding, coupled with the large free volume due to the growth mechanism lead to the slow deformation behavior observed.

To overcome fabrication limitations in existing methods, embodiments of the present invention use colloidal synthesis to develop MGs. Rather than rapidly cool, the disordered structure is achieved by a rapid reduction of a metal salt using a strong reducing agent, e.g., a compound with a reducing potential of around −1.25 eV. These colloidally grown MGs have low atomic percent (e.g., 10% to 30%) of a secondary element, such as boron. XPS data show the presence of both Ni metallic bonding as well as Ni—B bonding. In situ SEM mechanical compressions of 89, 196, and 263 nm Ni nanoparticles show an initial linear elastic plastic region followed by a transition to a second linear region. The transition was identified by a single slowly propagating slip event for 89 nm particles while a slip event was only observed in 44% and 33% of 196 and 270 nm particles, respectively. The speed of the slip event decreased from 9 to 5 nm/s with increasing size. Besides the single slip event at the transition, no other slips were observed during compression for all sizes.

In situ TEM compressions of similar sized particles show that the slip events cannot be characterized as shear bands. Unlike shear bands which travel through the material at a large velocity, the slip events propagated in a controlled manner and were pushed along by the tip. Similar to SEM compressions, small nanoparticles displayed slips whereas the same bimodal behavior was observed in the large nanoparticles.

In one illustrative example, Ni nanoparticles are synthesized through the rapid reduction of nickel ions in the presence of oleic acid (OA) and sodium dodecyl sulfate (SDS). OA attaches to the nanoparticle surface and SDS forms micelles, which are used to create monodisperse nanoparticles. An aqueous solution of 1 mM nickel nitrate, 10 mM SDS, and 0.1 mM of OA is first formed and stirred at room temperature. Before this, the oleic acid is dissolved in methanol to promote mixing. $NaBH_4$ is rapidly added to the aqueous solution to form nanoparticles. The amount of $NaBH_4$ determines the size of the nanoparticles. For 10 mL of solution, 2.5 mg of $NaBH_4$ forms particles that are approximately 41±2 nm in diameter, while 1 mg $NaBH_4$ forms particles that are 74±2 nm in diameter. The solution turns dark within seconds and is left, unstirred, for an hour before centrifugation. The synthesis produces a monodisperse sample (<±5%) for nanoparticle sizes below 100 nm. Synthesis of larger nanoparticles also forms smaller particles which can be removed using size-selective centrifugation. All chemicals were purchased from SigmaAldrich.

The concentration of Ni and B is measured using a Thermo Scientific ICAP 6300 Duo View Spectrometer. Synthesized nanoparticles are digested in a 1% v/v nitric acid solution. Standards were purchased from Inorganic Ventures. X-ray photoelectron spectroscopy (XPS) was performed on a PHI VersaProbe 1 Scanning XPS Microprobe using Al(Kα) radiation (1486 eV) at $10^{-6}$ Pa.

In variations of the process above, the nanoparticles may be synthesized with other combinations of elements such as, for example, Fe—B, Co—B, or Co—Ni—B.

TEM images were taken on a FEI Tecnai G2 F20 X-TWIN at 200 kV.

X-ray diffraction of 72 nm Ni nanoparticles was performed at the Lawrence Berkeley National Lab Advanced Light Source, Beamline 12.2.2. Nanoparticles were collected into a 1 mm borosilicate capillary tube with 10 µm walls from CharlesSupper. The diffraction pattern was collected on a 3450×3450 pixel detector.

Ni nanoparticles compressions were performed using a FEI Helios NanoLab 600i DualBeam FIB/SEM using the Nanoflip in-situ mechanical tester from Nanomechanics, Inc. Nanoparticles are drop cast onto a Si wafer and compressed under load control at 1 µN/s with a data acquisition rate of 400 Hz. Corrections are made for frame stiffness and indentation of the nanoparticle into the Si substrate as well as the diamond tip using an elastic half-space model.

TEM compressions were performed at the Center for Integrated Nanotechnologies using a PI-95 nanoindenter from Bruker Inc. in a JEOL 2100 high-contrast TEM at 200 kV. Nanoparticles were drop cast onto a 1 µm Si wedge and compressed under load control at 2 µN/s with a data acquisition rate of 200 Hz. Videos were taken at a capture rate of approximately 100 ms.

FIG. 1A shows a bright field TEM image of 74±2 nm nanoparticles. Inset is corresponding TEM diffraction pattern which shows the amorphous nature of the nanoparticles. Scale bar is 100 nm.

FIG. 1B shows an HRTEM image of 30 nm nanoparticle. Scale bar is 10 nm. This image also shows an amorphous microstructure, as well as the lack of oxide on the particle surface. The exact mechanism for Ni MG formation is unknown but it is thought that rapid reduction leads to uncoordinated growth of Ni clusters. Boron from $NaBH_4$ helps to prevent crystalline packing. We measure a boron concentration of 21% for 80-100 nm particles using ICP-OE. Smaller (≈20-30 nm) particles had a boron concentration of 28%, which could indicate a radial or size dependent composition.

To determine the bonding characteristics of boron and nickel, we compare binding energies in the XPS spectra to binding energies for metallic Ni and crystalline $Ni_2B$. In sub-10 nm NiB nanoparticles, the energy difference between the Ni $2p_{3/2}$ peak and its first satellite ($\Delta E$) can be used to determine whether the Ni atomic bonds are metallic in nature. $\Delta E$ is 5.8-6 eV for pure Ni, and 3.2 eV for $Ni_2B$. In our nanoparticles, $\Delta E$ is 6.2 eV, which indicates that the Ni bonding is mostly metallic. The peak position, 852.8 eV, is also very close to the peak position of pure Ni, 852.6 eV.

Boron bond type can be determined from the B 1s peak. The Ni—B binding energy for $Ni_2B$ occurs at 187.9-188.2 eV, the B—O binding energy occurs at 193.8 eV, and the B—B binding energy occurs at 186.5-187.1 eV. Our Ni nanoparticles have a peak at 188 eV, which indicates that the boron forms mostly B—Ni bonds and there is electron transfer from boron to nickel.

Figures 3A, 3B, 3C:
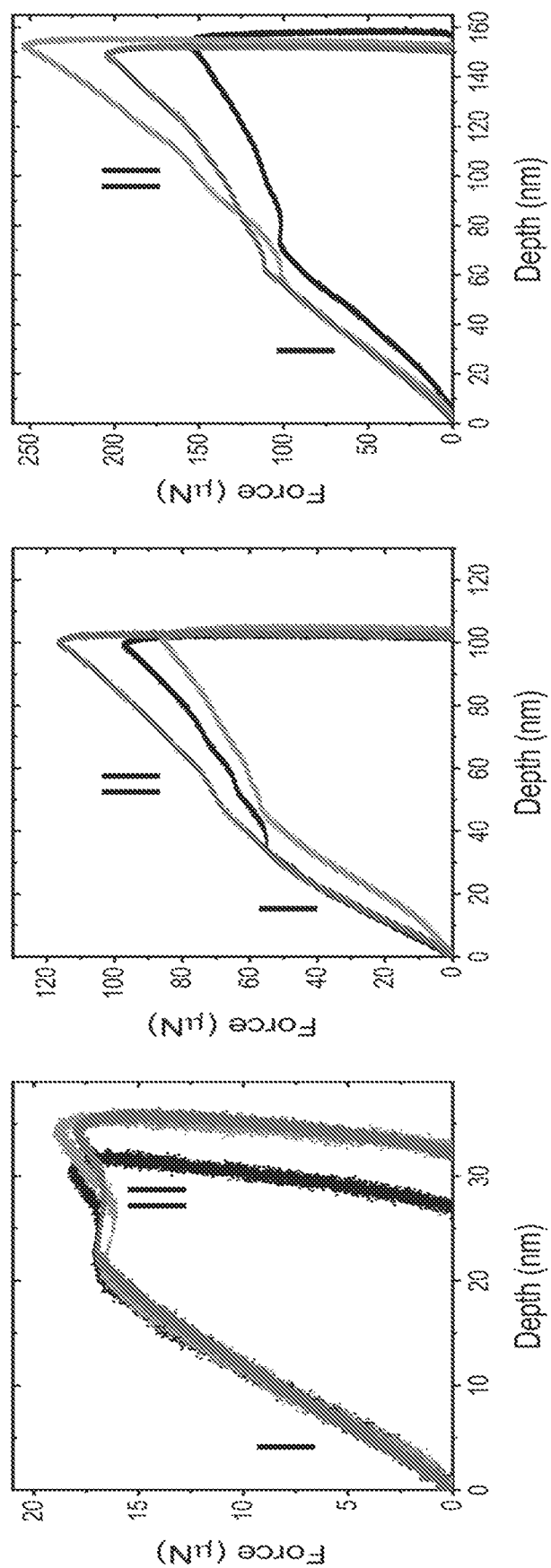
FIGS. 3A-C are force-displacement curves from in situ SEM compressions of different size nanoparticles, according to an embodiment of the invention.

In situ SEM compression of the nanoparticles showed size dependent behavior. FIGS. 3A-C show representative force-displacement curves from in situ SEM compressions of (FIG. 3A) 89±6 nm, (FIG. 3B) 196±7 nm, and (FIG. 3C) 263±6 nm nanoparticles. For all sizes, there is an initial loading region, Region I, characterized by a linear force displacement curve. This region had a slope of 694±102, 1162±214, and 1665±248 μN/nm for 89±6, 196±7, and 263±6 nm particles, respectively. After 22%, 28%, and 24% strain in the 89, 196, and 263 nm particles, respectively, a distinct second region, Region II, in the force-displacement curve emerges that is lower in slope. For all sizes, the transition between the two regions is identified by either a plateauing/decrease in force or a sudden transition to a different sloped region. In one test of the 196 nm, a second slip event was also observed later in Region II. The slowly-propagating transition event occurs in 88% of the 89 nm particles, 44% in the 196 nm particles, and 33% in 263 nm particles. The normalized size of the transition event decreases slightly with increasing size, 0.040, 0.028, and 0.020, respectively. The speed of the slip event also decreases with size: 9.1±2.9, 6.4±4, and 5.0±1.9 nm/s. For two tests of the 193 nm, the slip event was faster than the acquisition rate. The slow propagation of the slip event does not match shear bands velocities, which are on the order of 300 nm/s for similar size pillars. Table I has the tabulated data on the initial slope as well as the slip statistics.

TABLE 1

Summary of compression data for all nanoparticle sizes

| Nanoparticle Size (nm) | 89 ± 6 | 196 ± 7 | 203 ± 6 |
| --- | --- | --- | --- |
| Region I slope (μN/nm) | 694 ± 102 | 1162 ± 214 | 1665 ± 248 |
| Probability of slip event | 88% | 44% | 33% |
| Normalized slip length | .04 | .028 | .02 |
| Slip speed (nm/s) | 9.1 ± 2.9 | 6.4 ± 2 | 5.0 ± 1.9 |

Cyclic testing was performed in region I and region II on 89 nm particles to test whether deformation was elastic or elastic-plastic.

Figure 4B:
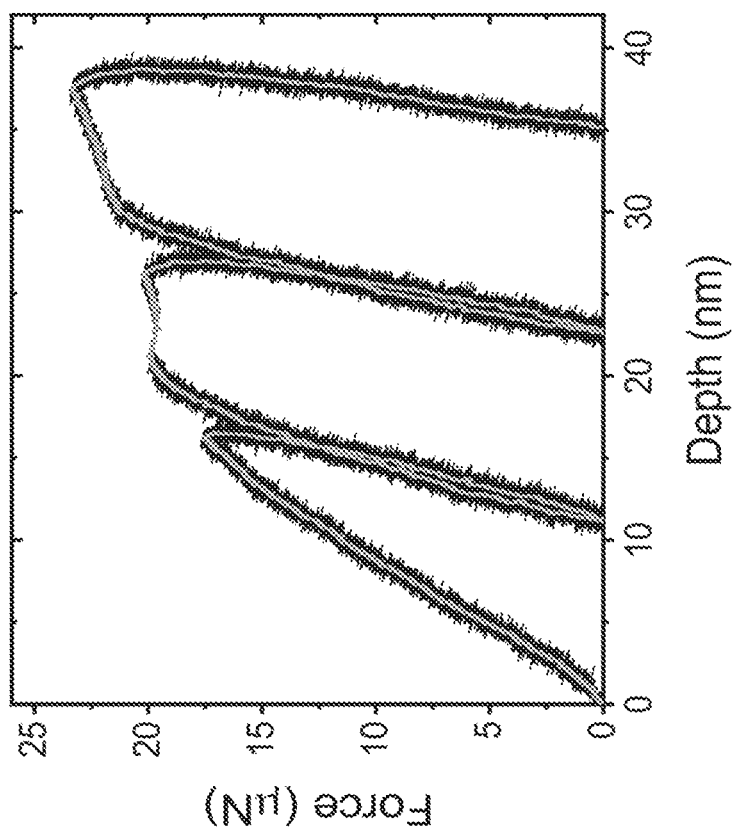
FIGS. 4A-B are in situ SEM cyclic loading/unloading tests of 89 nm Ni nanoparticles, showing cycling in two different regions, according to an embodiment of the invention.
Figure 4A:
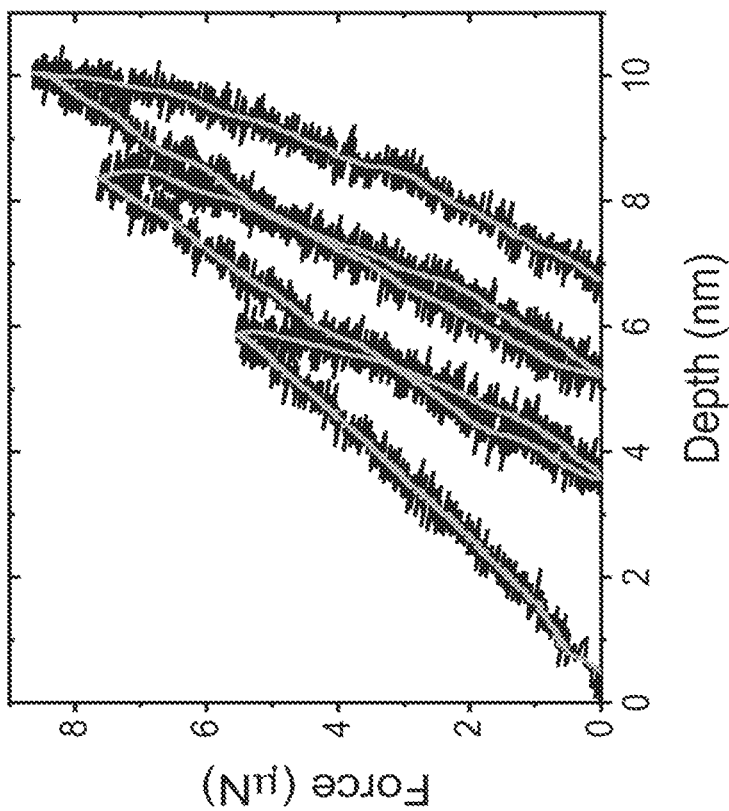

FIGS. 4A-B show representative in situ SEM cyclic loading/unloading tests of 89 nm Ni nanoparticles: (FIG. 4A) Cycling in Region I, (FIG. 4B) Cycling in Region I and II. A viscoelastic effect during cycling is also revealed in both Region I and II, in which the unloading portion of the preceding cycle reaches larger depths than the loading portion of the subsequent cycle. This indicates an elasticity. The difference in loading/unloading curve arises from the structure: STZs surrounded by a denser, more elastic, region, similar to a core-shell structure. The dense, elastic shell applies a back stress on sheared STZs, which can activate STZs in the reverse direction leading to viscoplastic behavior. Cyclic loading for larger displacements also show that there is continued elastic-plastic loading post-slip (FIG. 4B).

Since the particles yield in Region I, we cannot attribute a yield strength to the different sizes. To get an idea of the stress on the particles, we divide the force at the transition between Region I and II by the initial cross sectional area of the nanoparticles. The stress is 2.47±0.31, 1.88±0.21, and 1.77±0.13 GPa for 89, 196, and 263 nm particles, respectively. In comparison, 200 nm <111> oriented Ni pillars have a true stress of approximately 1300 MPa at 3% strain.

Figure 5A:
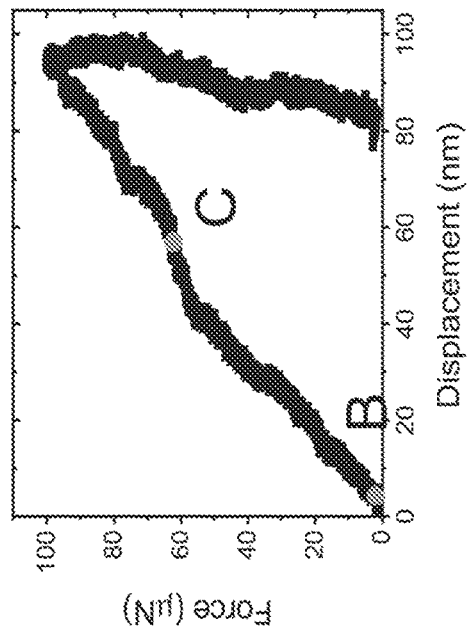
FIGS. 5A and 5D are force-displacement curves of nanoparticles of two different sizes, according to an embodiment of the invention.
Figure 5B:
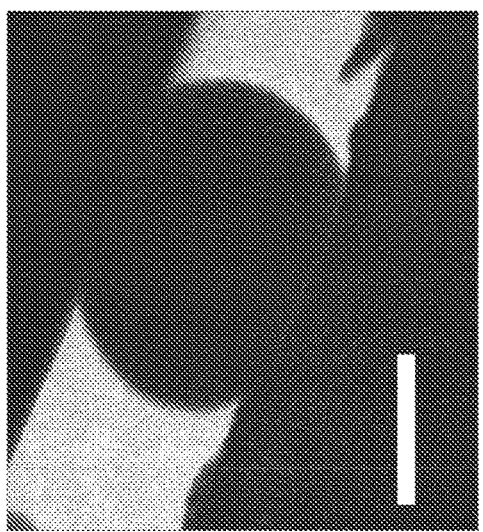
FIGS. 5B-C and FIGS. 5E-F are TEM images during deformation for nanoparticles of two different sizes, according to an embodiment of the invention.

To investigate the underlying physical processes that correspond to these deformation events, we performed in situ TEM compression of the nanoparticles. Compression tests were performed on a 210 nm (FIGS. 5A-C), and a 237 nm particle (FIGS. 5D-F). We see two distinct behaviors that were also observed in the in situ SEM compression tests. In FIG. 5A, we see a force-displacement curve of a 210 nm particle with no slip event and a smooth transition between two separate linear regions. The corresponding snapshots show only homogenous deformation for both linear regions (FIGS. 5B,C). In contrast, FIG. 5D shows the force-displacement curve and snapshots of a 237 nm particle. At the transition, a slow slip event of approximately 15 nm is observed at the surface at approximately 27° from the loading direction (FIG. 5E). This event marks the transition to region II of the force-displacement curve, and occurs at a speed of approximately 9.9 nm/s.

Figure 5C:
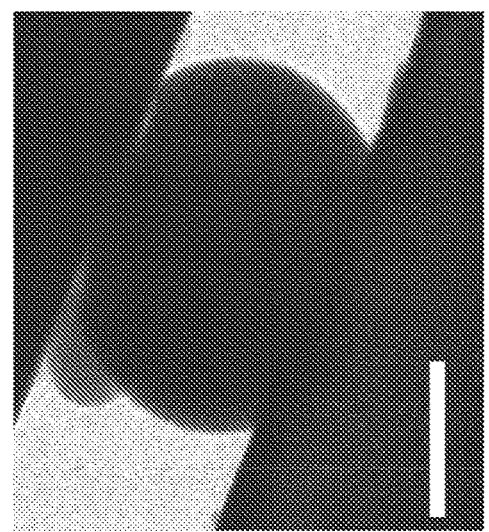
Figure 5D:
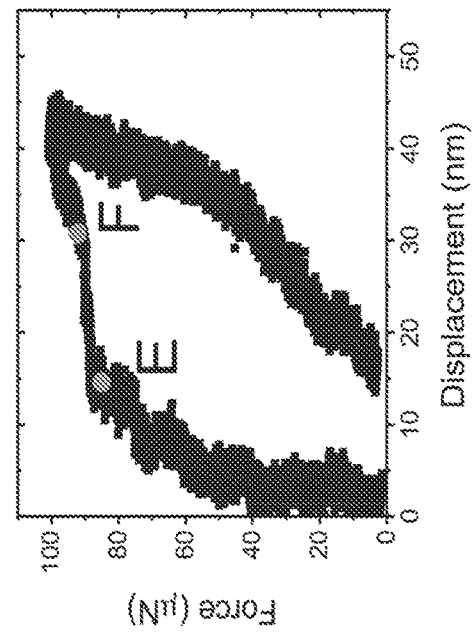
Figure 5E:
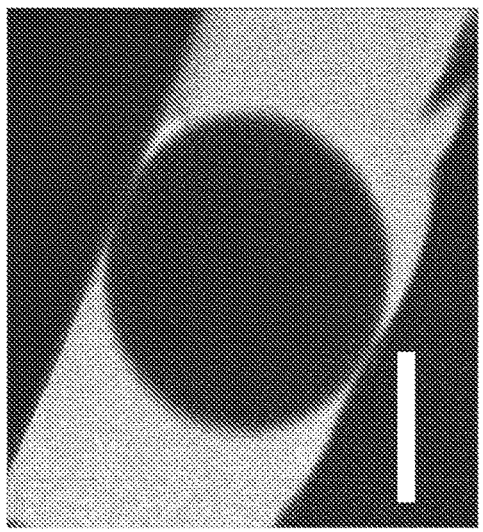
Figure 5F:
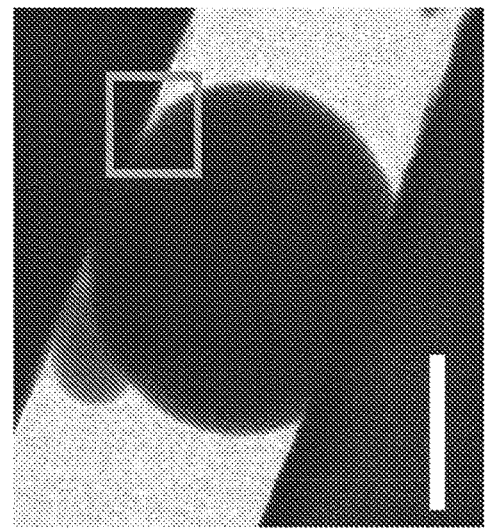

FIGS. 5A-F show in situ TEM compression of (FIGS. 5A-C) 210 nm, and (FIGS. 5D-F) 237 nm nanoparticles. FIG. 5A and FIG. 5D are force-displacement curves. FIG. 5B and FIG. 5E are TEM images during deformation in region I, and FIG. 5C and FIG. 5F are TEM images during Region II. All scale bars are 100 nm. The location on the force-displacement curve that corresponds to these images has been denoted in FIG. 5A and FIG. 5D by dots. Square denotes location of slip event.

The major difference between nanopillars and the nanoparticles is that MG nanopillars show a decrease in slip length and shear band speeds as pillar diameter is reduced, while the nanoparticles show an increase in slip length and shear band speeds as nanoparticle diameter is reduced. One proposed mechanism for the brittle-to-ductile transition in MG nanopillars is that the amount of elastic energy relieved by a shear band decreases much faster than the energy for shear band formation with decreasing sample size. Thus, the stress for shear band formation scales as a function of $d^{-1/2}$ until the sample is small enough for homogenous plastic flow to occur, after which the strength of the nanopillar is size independent. The size at which the ductile-to-brittle transition occurs is dependent on a variety of conditions, most notably the Poisson's ratio, and is not sudden but rather a gradual change from catastrophic slip events to small serrations. For most MGs, this transition occurs at 0.1-1 μm. Another explanation for the ductile-to-brittle transition relates it to the intrinsic length scale of shear banding. Homogeneous deformation occurs once sample size is comparable to the typical spacing between shear bands.

These mechanisms likely contribute to enhanced ductility in the MG nanoparticles (of all sizes), but do not explain the observed inverse size dependence. While strain rate affects deformation mode in MGs, the difference in strain rate between the small and large particles is insufficient to explain the difference in ductility. For instance, it has been found that a power-law relationship between strain rate and pillar size demarcates the ductile-to-brittle transition. We propose that the behavior of the nanoparticles is due to structural and chemical differences between particles of different size. ICP-OES and XPS indicate that smaller particles have a higher boron concentration, more metal-metalloid bonds and fewer metal-metal bonds than large nanoparticles. Since the growth of these particles is via aggregation, we posit there is a radial dependence in boron concentration which leads to changes in bonding. This has previously been seen in colloidally synthesized amorphous $Co_2B$ nanoparticles. This is another difference between the nanoparticles and metallic glass nanopillars, as other MG fabrication methods do not result in radially dependent morphologies.

Previous studies on bulk $Fe_{80-x}Ni_xP_{13}C_7$ metal-metalloid MGs provide insight into the relationship between atomic bonding and mechanical behavior. By increasing the concentration of Ni, the bonding between clusters was shown to be metallic Ni—Ni bonds while the bonding in the clusters was Fe—P/C metal-metalloid bonds. Increased metallic bonding effectively accommodated shear strain, prevented catastrophic shear banding, and led to lower fracture strength. We conclude that this mechanism is responsible for increased ductility and decreased strength in larger MG nanoparticles. In the larger nanoparticles, there is a lower probability of breaking metal-metalloid Ni—B bonds and a higher probability of breaking metal-metal Ni—Ni bonds during deformation compared to smaller nanoparticles. This proposed cluster structure is in agreement with the core-shell structure necessary for the viscoelastic effect seen in FIG. 5. This analysis indicates that modest changes in composition and atomic bonding play a larger role in controlling mechanical behavior than sample size at the nanoscale.

The invention claimed is:
1. A method of making a consolidated metallic glass structure, the method comprising:
   fabricating metallic glass nanoparticles with a solution-phase synthesis that provides coated metallic glass nanoparticles wrapped in a polymer ligand layer;
   stripping the polymer ligand layer from the coated metallic glass nanoparticles with a solvent to provide bare metallic glass nanoparticles;
   depositing the bare metallic glass nanoparticles on a substrate to provide a deposited structure;
   sintering the deposited structure with heat and/or pressure to provide the consolidated metallic glass structure.
2. The method of claim 1, wherein fabricating metallic glass nanoparticles comprises combining a metallic salt with a reducing agent in the presence of a polymer ligand.
3. The method of claim 1, wherein the metallic glass nanoparticles are composed of nickel and boron, iron and boron, cobalt and boron, or any combination of the previous metals and boron.
4. The method of claim 1, wherein sintering the deposited structure comprises using a hot press, heated pellet press, or spark plasma sintering.

* * * * *